United States Patent
McBrearty et al.

(10) Patent No.: US 6,662,268 B1
(45) Date of Patent: Dec. 9, 2003

(54) SYSTEM AND METHOD FOR STRIPED MIRROR RE-SYNCHRONIZATION BY LOGICAL PARTITION RATHER THAN STRIPE UNITS

(75) Inventors: Gerald Francis McBrearty, Austin, TX (US); Johnny Meng-Han Shieh, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/388,951

(22) Filed: Sep. 2, 1999

(51) Int. Cl.$^7$ .............................................. G06F 12/02
(52) U.S. Cl. ..................... 711/114; 711/111; 711/112; 711/161; 711/162
(58) Field of Search ..................... 711/111, 112, 114, 711/161, 162

(56) References Cited

U.S. PATENT DOCUMENTS

| | | | | |
|---|---|---|---|---|
| 5,845,295 A | * | 12/1998 | Houseman et al. | 707/203 |
| 5,897,661 A | * | 4/1999 | Baranovsky et al. | 711/170 |
| 6,216,211 B1 | * | 4/2001 | McBrearty et al. | 711/162 |
| 6,260,124 B1 | * | 7/2001 | Crockett et al. | 711/112 |
| 6,366,986 B1 | * | 4/2002 | St. Pierre et al. | 711/162 |
| 6,463,573 B1 | * | 10/2002 | Maddalozzo et al. | 716/6 |

* cited by examiner

Primary Examiner—T. V. Nguyen
(74) Attorney, Agent, or Firm—Duke W. Yee; Volel Emile; Stephen J. Walder, Jr.

(57) ABSTRACT

Striped mirrors are re-synchronized by logical partition rather than by stripe unit for stale partitions. While re-synchronizing physical partitions, data is serialized across both the stripe unit and the real partition region. The re-sync Read operation uses the normal logical partition offsets to read on a physical partition boundary rather than using the stripe units. In so doing, a single disk in a striped mirror can be replaced without re-synchronizing the entire mirror. The resync Read is not broken up into individual stripe unit reads.

23 Claims, 8 Drawing Sheets

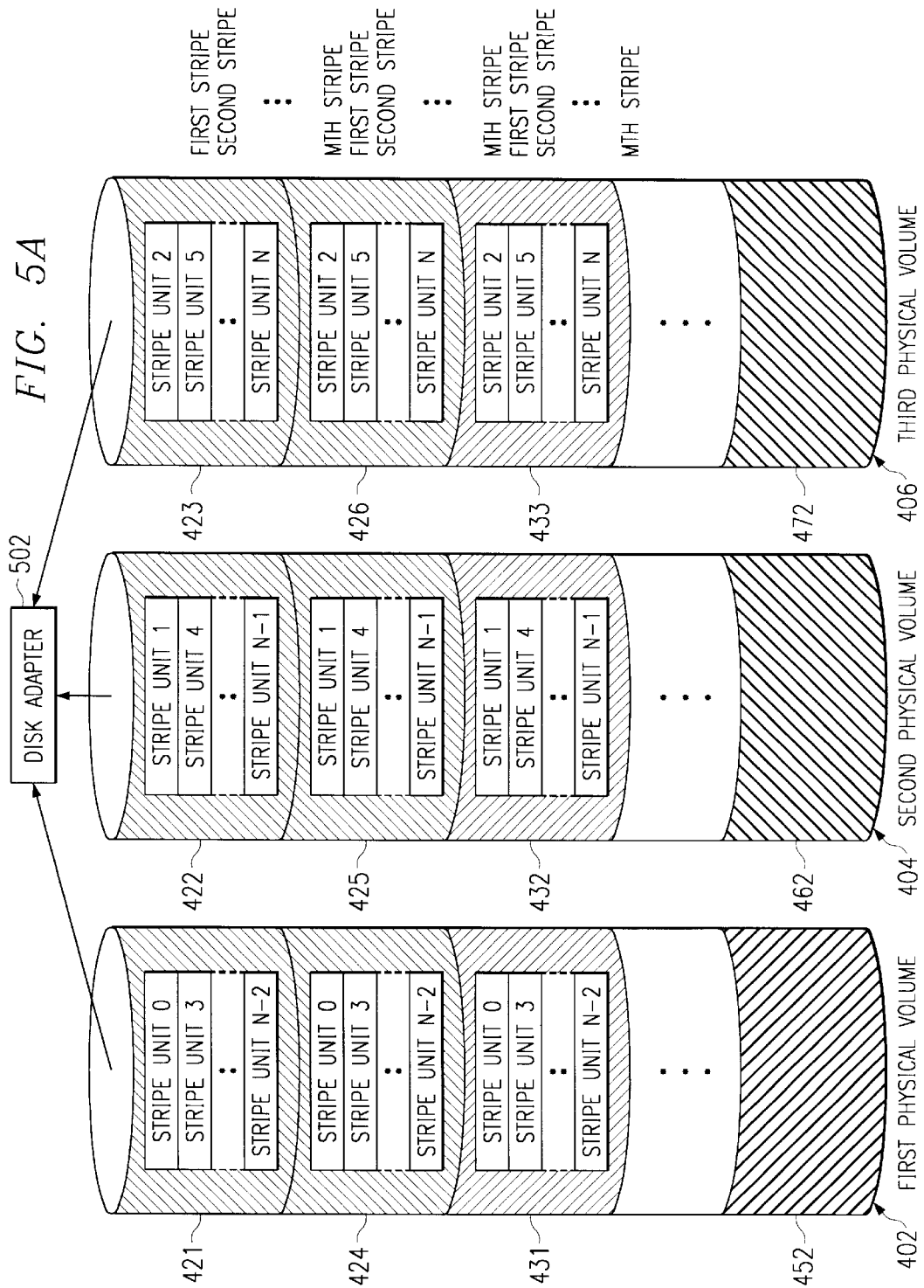

US 6,662,268 B1

SYSTEM AND METHOD FOR STRIPED MIRROR RE-SYNCHRONIZATION BY LOGICAL PARTITION RATHER THAN STRIPE UNITS

BACKGROUND OF THE INVENTION

1. Technical Field

The present invention relates to information processing technology. More particularly, the present invention relates to providing means for improving efficient and reliable of stored data.

2. Description of Related Art

The UNIX operating system is a multi-user operating system supporting serial or network connected terminals for more than one user. It supports multi-tasking and a hierarchical directory structure for the organization and maintenance of files. UNIX is portable, requiring only the kernel (<10%) written in assembler, and supports a wide range of support tools including development, debuggers, and compilers.

The UNIX operating system consists of the kernel, shell, and utilities. The kernel schedules tasks, manages data/file access and storage, enforces security mechanisms, and performs all hardware access. The shell presents each user with a prompt, interprets commands typed by a user, executes user commands, and supports a custom environment for each user. Finally, the utilities provide file management (rm, cat, ls, rmdir, mkdir), user management (passwd, chmod, chgrp), process management (kill, ps), and printing (lp, troff, pr).

A multi-user operating system allows more than one user to share the same computer system at the same time. It does this by time-slicing the computer processor at regular intervals between the various people using the system. Each user gets a set percentage of some amount of time for instruction execution during the time each user has the processor. After a user's allotted time has expired, the operations system intervenes, saving the program's state (program code and data), and then starts running the next user's program (for the user's set percentage of time). This process continues until, eventually, the first user has the processor again.

It takes time to save/restore the program's state and switch from one program to another (called dispatching). This action is performed by the kernel and must execute quickly, because it is important to spend the majority of time running user programs, not switching between them. The amount of time that is spent in the system state (i.e., running the kernel and performing tasks like switching between user programs) is called the system overhead and should typically be less than 10%.

Switching between user programs in main memory is done by part of the kernel. Main system memory is divided into portions for the operating system and user programs. Kernel space is kept separate from user programs. Where there is insufficient main memory to run a program, some other program residing in main memory must be written out to a disk unit to create some free memory space. A decision is made about which program is the best candidate to swap out to disk. This process is called swapping. When the system becomes overloaded (i.e., where there are more people than the system can handle), the operating system spends most of its time shuttling programs between main memory and the disk unit, and response time degrades.

In UNIX operating systems, each user is presented with a shell. This is a program that displays the user prompt, handles user input, and displays output on the terminal. The shell program provides a mechanism for customizing each user's setup requirements, and storing this information for re-use (in a file called profile).

When the UNIX operating system starts up, it also starts a system process (getty) which monitors the state of each terminal input line. When getty detects that a user has turned on a terminal, it presents the logon prompt; and once the password is validated, the UNIX system associates the shell program (such as sh) with that terminal (typically there are a number of different shells including ksh and csh). Each user interacts with sh, which interprets each command typed. Internal commands are handled within the shell (set, unset); external commands are invoked as programs (ls, grep, sort, ps).

Multi-tasking operating systems permit more than one program to run at once. This is done in the same way as a multi-user system, by rapidly switching the processor between the various programs. OS/2, available from IBM Corporation, One New Orchard Road, Armonk, N.Y. 10504; and Windows 95, available from Microsoft Corporation, One Microsoft Way, Redmond, Wash. 98052, are examples of multi-tasking single-user operating systems. UNIX is an example of a multi-tasking multi-user operating system. A multi-user system is also a multi-tasking system. This means that a user can run more than one program at once, using key selections to switch between them.

Multi-tasking systems support foreground and background tasks. A foreground task is one the user interacts directly with using the keyboard and screen. A background task is one that runs in the background (i.e., It does not have access to the screen or keyboard.). Background tasks include operations like printing, which can be spooled for later execution.

The role of the operating system is to keep track of all the programs, allocating resources like disks, memory, and printer queues as required. To do this, it must ensure that one program does not get more than its fair share of the computer resources. The operating system does this by two methods: scheduling priority, and system semaphores. Each program is assigned a priority level. Higher priority tasks (like reading and writing to the disk) are performed more regularly. User programs may have their priority adjusted dynamically, upwards or downwards, depending upon their activity and available system resources. System semaphores are used by the operating system to control system resources. A program can be assigned a resource by getting a semaphore (via a system call to the operating system). When the resource is no longer needed, the semaphore is returned to the operating system, which can then allocate it to another program.

Disk drives and printers are serial in nature. This means that only one request can be performed at any one time. In order for more than one user to use these resources at once, the operating system manages them via queues. Each serial device is associated with a queue. When a user program wants access to the disk, for example, it sends the request to the queue associated with the disk. The operating system runs background tasks (called daemons), which monitor these queues and service requests from them. A request is then performed by this daemon process, and the results are sent back to the user's program.

Multi-tasking systems provide a set of utilities for managing processes. In UNIX, these are ps (list processes), kill (kill a process), and & (run a process in the background). In UNIX, all user programs and application software use the system call interface to access system resources like disks, printers, memory etc. The system call interface in UNIX provides a set of system calls (C functions). The purpose of the system call interface is to provide system integrity. As all low level hardware access is under control of the operating system, this prevents a program from corrupting the system.

The operating system, upon receiving a system call, validates its authenticity or permission, then executes it on behalf of the program, after which it returns the results. If the request is invalid or not authenticated, then the operating system does not perform the request but simply returns an error code to the program. The system call is accessible as a set of 'C' functions, as the majority of UNIX is also written in 'C'. Typical system calls are: _read—for reading from the disk unit; _write—for writing to the disk unit; _getch—for reading a character from a terminal; _putch—for writing a character to the terminal; and _ioctl—for controlling and setting device parameters.

The fundamental structure that the UNIX operating system uses to store information is the file. A file is a sequence of bytes, typically 8 bits long, and is equivalent to a character. UNIX keeps track of files internally by assigning each one a unique identifying number. These numbers, called i-node numbers, are used only within the UNIX operating system kernel itself. While UNIX uses i-node number to refer to files, it allows users to identify each file by a user-assigned name. A file name can be any sequence containing from one to fourteen characters.

There are three types of files in the UNIX file system: (1) ordinary files, which may be executable programs, text, or other types of data used as input or produced as output from some operation; (2) directory files, which contain lists of files; and (3) special files, which provide a standard method of accessing I/O devices.

UNIX provides users with a way of organizing files. Files may be grouped into directories. Internally, a directory is a file that contains the names of ordinary files and other directories, and their corresponding i-node numbers. Given the name of a file, UNIX looks in the file's directory and obtains the corresponding i-node number for the file. With this i-node number, UNIX can examine other internal tables to determine where the file is stored and make it accessible to the user. UNIX directories themselves have names, each of which may also contain fourteen characters.

Just as directories provide a means for users to group files, UNIX supports the grouping of directories into a hierarchical file system. At the very top of a hierarchy is a directory. It may contain the names of individual files and the names of other directories. These, in turn, may contain the names of individual files and still other directories, and so on. A hierarchy of files is the result. The UNIX file hierarchy resembles an upside-down tree, with its root at the top. The various directories branch out until they finally trace a path to the individual files, which correspond to the tree's leaves. The UNIX file system is described as "tree-structured," with a single directory. All the files that can be reached by tracing a path down through the directory hierarchy from the root directory constitute the file system.

UNIX maintains a great deal of information about the files that it manages. For each file, the file system keeps track of the file's size, location, ownership, security, type, creation time, modification time, and access time. All of this information is maintained automatically by the file system as the files are created and used. UNIX file systems reside on mass storage devices such as disk files. These disk files may use fixed or removable type media, which may be rigid or flexible. UNIX organizes a disk as a sequence of blocks, which compose the file system. These blocks are usually either 512 or 2048 bytes long. The contents of a file are stored in one or more blocks, which may be widely scattered on the disk.

An ordinary file is addressed through the i-node structure. Each i-node is addressed by an index contained in an i-list. The i-list is generated based on the size of the file system, with larger file systems generally implying more files and, thus, larger i-lists. Each i-node contains thirteen 4-byte disk address elements. The direct i-node can contain up to ten block addresses. If the file is larger than this, then the eleventh address points to the first level indirect block. Address 12 and address 13 are used for second level and third level indirect blocks, respectively, with the indirect addressing chain before the first data block growing by one level as each new address slot in the direct i-node is required.

All input and output (I/O) is done by reading the writing files, because all peripheral devices, even terminals, are files in the file system. In a most general case, before reading and writing a file, it is necessary to inform the system of your intent to do so by opening the file. In order to write to a file, it may also be necessary to create it. When a file is opened or created (by way of the 'open' or 'create' system calls), the system checks for the right to do so and, if all is well, returns a non-negative integer called a file descriptor. Whenever I/O is to be done on this file, the file descriptor is used, instead of the name, to identify the file. This open file descriptor has associated with it a file table entry kept in the "process" space of the user who has opened the file. In UNIX terminology, the term "process" is used interchangeably with a program that is being executed. The file table entry contains information about an open file, including an i-node pointer for the file and the file pointer for the file, which defines the current position to be read or written in the file. All information about an open file is maintained by the system.

In conventional UNIX systems, all input and output is done by two system calls, 'read' and 'write,' which are accessed from programs having functions of the same name. For both system calls, the first argument is a file descriptor. The second argument is a pointer to a buffer that serves as the data source or destination. The third argument is the number of bytes to be transferred. Each 'read' or 'write' system call counts the number of bytes transferred. On reading, the number of bytes returned may be less than the number requested, because fewer than the number requested remain to be read. A return value of zero implies end of file, a return value of −1 indicates an error of some sort. For writing, the value returned is the number of bytes actually written. An error has occurred if this is not equal to the number which was supposed to be written.

The parameters of the 'read' and 'write' system calls may be manipulated by the application program that is accessing the file. The application must, therefore, be sensitive to and take advantage of the multi-level store characteristics inherent in a standard system memory hierarchy. It is advantageous, from the application perspective, if the system memory components can be viewed as a single level hierarchy. If this is properly done, the application could dispense with most of the I/O overhead.

One advantage of using a UNIX based operating system over other operating systems is that data can be isolated or segregated into different volume groups (VGs). The omnipresent "rootvg" contains the operating system details, and it is from this volume group that the computer runs. Similarly, data or application volume groups can also be created. The advantage of such volume groups is that, unlike competitive operating systems, an upgrade to a UNIX based operating system will only impact the rootvg, and will not affect application data. Analogously, application upgrades will not impact the operating system in any way, presuming that the application has been segregated into its own VG.

Faults are inevitable in digital computer systems due to such things as the complexity of the circuits and the associated electromechanical devices. To permit system operation, even after the occurrence of a fault, the art has developed a number of fault-tolerant designs. Improved fault-tolerant digital data processing systems include redundant functional units, e.g., duplicate CPUs, memories, and peripheral controllers interconnected along a common system bus. Each of a pair of functional units responds identically to input received from the bus. In the outputs, if a pair of functional units do not agree, that pair of units is taken off-line, and another pair of functional units (a "spare") continues to function in its place.

Even with the recent developments in fault-tolerant systems, there are characteristics of UNIX systems that make them difficult to adapt to conventional fault-tolerant operation. An important element of fault-tolerant systems is a maintenance and diagnostic system that automatically monitors the condition (or "state") of functional units of the data processing system, particularly those that are more readily replaceable ("field replaceable units," or FRUs). The complexity of UNIX based systems requires that such fault-tolerant systems maintenance and diagnostic systems (or "state machines") have capabilities that require state-of-the-art systems maintenance and diagnostics systems.

Disk failure is the most common hardware failure in the storage system, followed by failure of adapters and power supplies. Protection against disk failure primarily involves the configuration of the logical volumes. To protect against adapter and power supply failures, a popular configuration includes two adapters and at least one disk per adapter, with mirroring across adapters, without regard to the number of active blocks in the volume group. By mirroring the original data, copies are available in case of an interruption on the disk. Read efficiency is also improved because the logical volume manager is free to choose a less busy drive from which to read. RAID (redundant array of independent disks) is an alternative mirroring technique where data is striped block by (512-byte) block, but portions of several (not necessarily all) of the drives are set aside to hold parity information. This spreads the load of writing parity information more evenly.

Another technique which increases the I/O efficiency is striping the data across two or more physical DISKS Striping spreads the consecutively ordered data, such as a file, in a logical volume across several disk drives, in such a way that the I/O capacity of the disk drives can be used in parallel to access data on the logical volume. The primary objective of striping is very high-performance reading and writing of large sequential files. In a striped logical volume, the data addresses follow the sequence of stripe units rather than the data blocks themselves. A complete stripe consists of one stripe unit on each of the physical devices that contains part of the striped logical volume. The logical volume manager (LVM) determines which physical blocks on which physical drives correspond to a block being read or written.

The UNIX operating system, or "UNIX," "A weak pun on Multics," is an interactive time-sharing operating system invented in 1969 by Ken Thompson after he left Bell Labs and the Multics project, apparently to play games on his scavenged PDP-7 computer (minicomputer sold by Digital Electric Corp. (DEC), (Compaq Computer Corp., 20555 SH 249, Houston, Tex. 77070)). Thompson developed a new programming language 'B', and Dennis Ritchie enhanced 'B' to 'C' and helped develop 'UNIX'.

Efficiency and reliability are optimized by striping the physical volumes and then mirroring the striped volumes. A problem occurs when one disk in a mirror becomes inoperable, either through disk or controller problems. The data is then unable to be updated and becomes stale. When data in any physical disk of a mirror becomes unavailable, the entire mirror is not used, causing other physical partitions to become stale. Therefore, when the downed disk is replaced, the entire mirror must be re-synchronized with the logical volume. The synchronization process can be time consuming, because the entire mirror must be re-synced. The re-sync operations can normally take place when the system is restarted, when the volume group is activated, or when a re-sync command is manually issued.

It would be advantageous to provide a method for updating physical partitions in a mirror where some of the data is stale. It would further be advantageous to provide a means for re-syncing physical partitions in a mirror without re-syncing the entire mirror.

SUMMARY OF THE INVENTION

The present invention relates to a system and method for synchronizing striped mirrors by logical partition or region rather than by stripe unit for stale partitions. During re-synchronizing of physical partitions, data is serializing across both the stripe unit and the real region. The re-sync Read operation uses the normal offsets to read on a physical partition boundary rather than using the stripe units. In so doing, a single disk in a striped mirror can be replaced without re-synchronizing the entire mirror.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5A depicts LVs which were shown in FIGS. 4A and 4B, as striped volumes;

DETAILED DESCRIPTION OF THE PREFERRED EMBODIMENT

Figure 1:
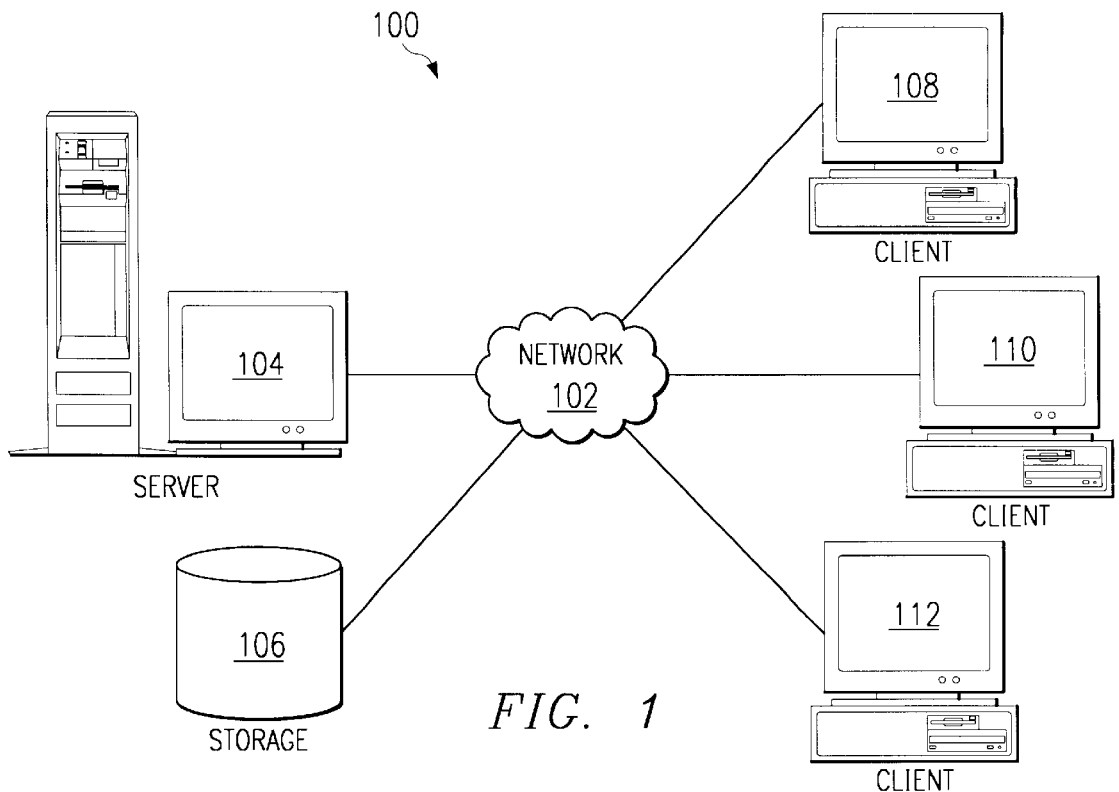
FIG. 1 is a pictorial representation of a distributed data processing system in which the present invention may be implemented.

With reference now to the figures, FIG. 1 is a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110 and 112 also are connected to network 102. These clients 108, 110 and 112 may be, for example, personal computers or network computers. For purposes of this application, a network computer is any computer coupled to a network, which receives a program or other application from another computer coupled to the network. In the depicted example, server 104 provides data, such as boot files, operating system images, and applications to clients 108, 110 and 112. Clients 108, 110 and 112 are clients to server 104. Distributed data processing system 100 may include additional servers, clients, and other devices not shown.

In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, education, and other computer systems that route data and messages. Of course, distributed data processing system 100 also may be implemented as a number of different types of networks, such as, for example, an intranet, a local area network (LAN), or a wide area network (WAN). FIG. 1 is intended as an example and not as an architectural limitation for the present invention.

Figure 2:
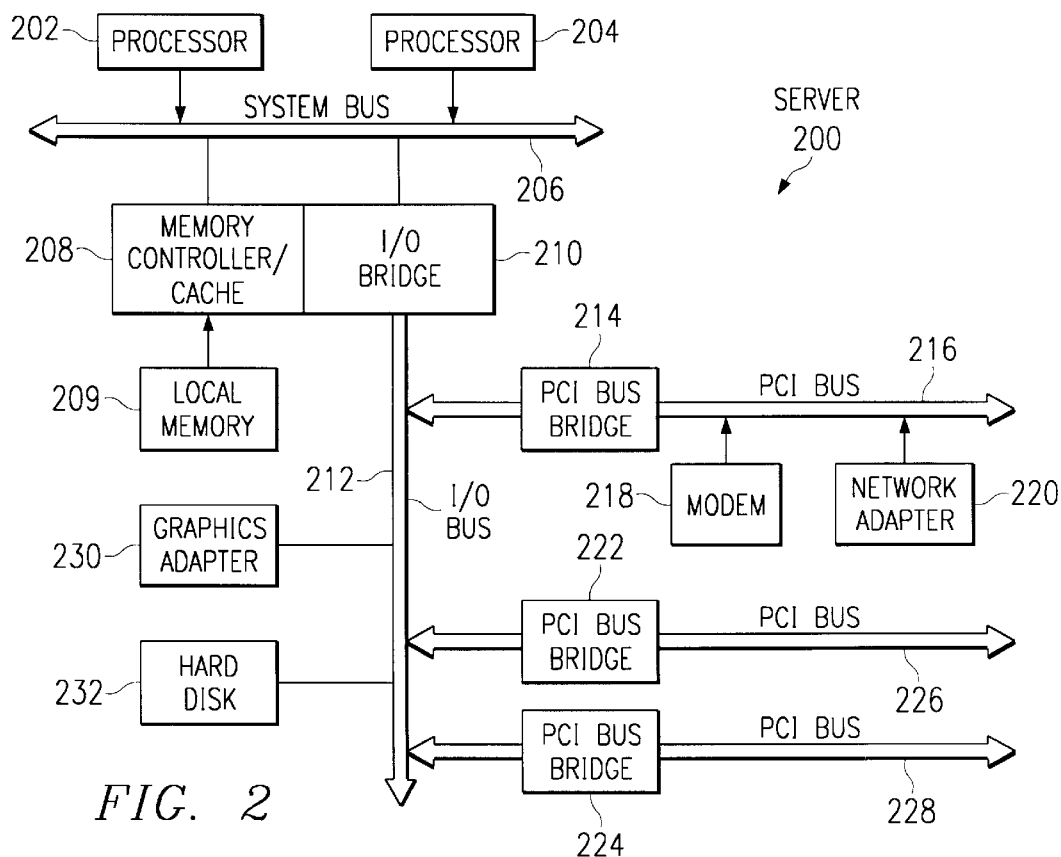
FIG. 2 is a block diagram depicting a data processing system that may be implemented as a server in accordance with a preferred embodiment of the present invention.

Referring to FIG. 2, a block diagram depicts a data processing system which may be implemented as a server, such as server 104 in FIG. 1, in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations support four PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI buses 226 and 228, from which additional modems or network adapters may be supported. A memory-mapped graphics adapter 230 and hard disk 232 may also be connected to I/O bus 212 as depicted, either directly or indirectly.

Figure 3:
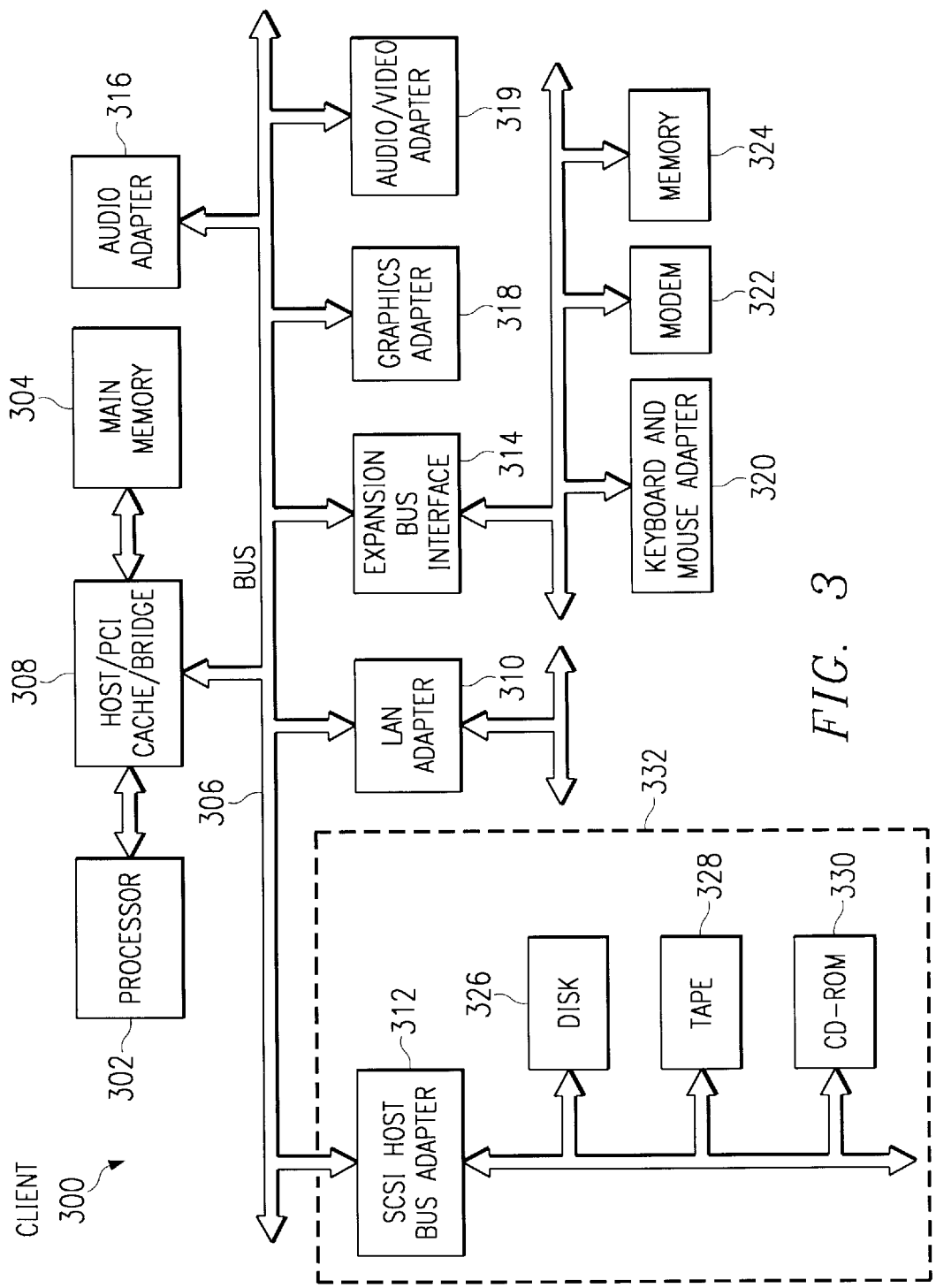
FIG. 3 is a block diagram illustrating a data processing system in which the present invention may be implemented.

With reference now to FIG. 3, a block diagram illustrates a data processing system in which the present invention may be implemented. Data processing system 300 is an example of a client computer. Data processing system 300 employs a peripheral component interconnect (PCI) local bus architecture. Although the depicted example employs a PCI bus, other bus architectures, such as Micro Channel and ISA, may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations support three or four PCI expansion slots or add-in connectors.

An operating system runs on processor 302 and is used to coordinate and provide control of various components within data processing system 300 in FIG. 3. The operating system may be a commercially available operating system such as a UNIX based operating system, AIX for instance, which is available from International Business Machines Corporation. "AIX" is a trademark of International Business Machines Corporation. Other operating systems include OS/2. An object oriented programming system, such as Java, may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3, denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide nonvolatile memory for storing operating system files and/or user-generated data.

The depicted example in FIG. 3, as well as above-described examples, are not meant to imply architectural limitations.

Figure 4A:
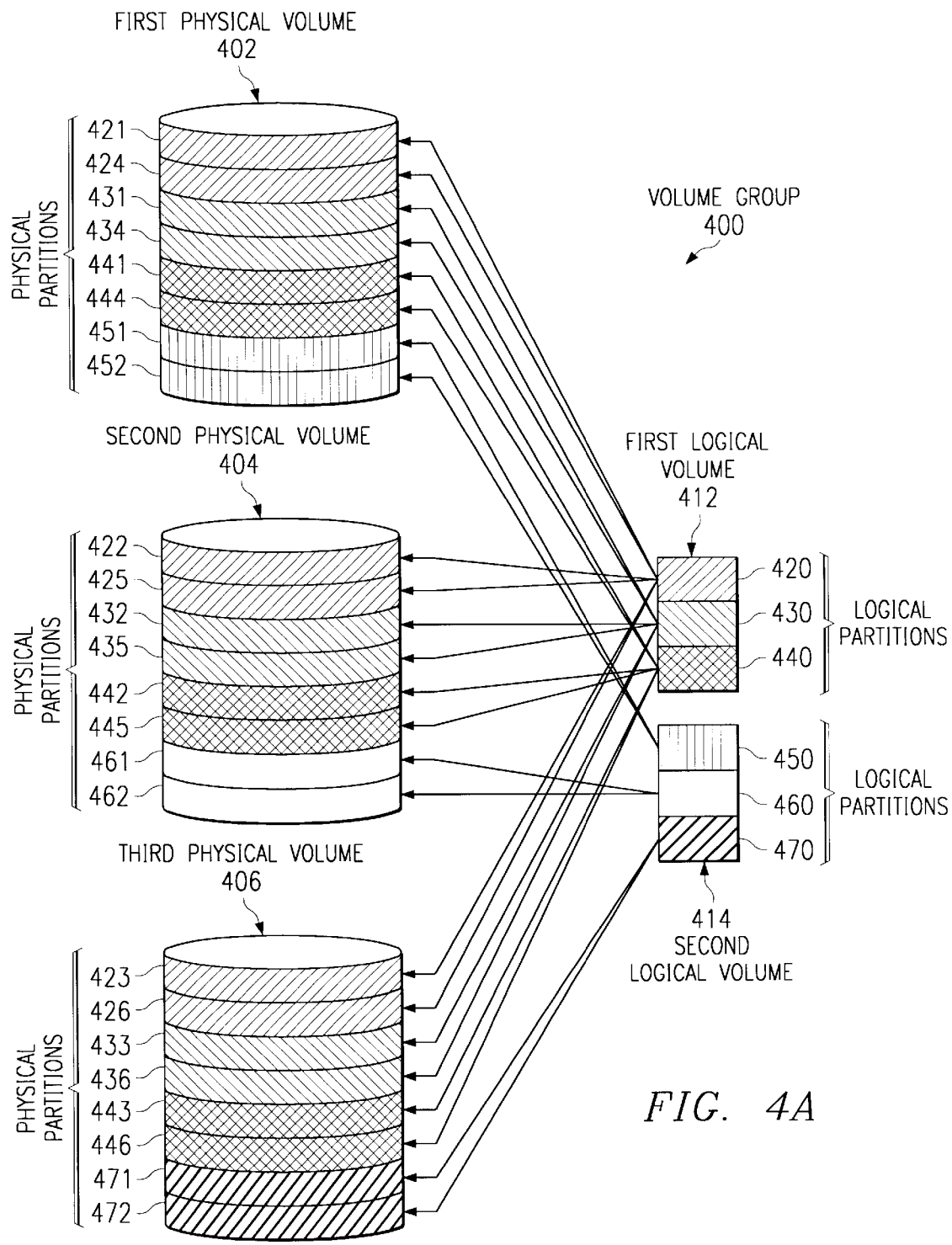
FIG. 4A illustrates the relationship among physical volumes, physical devices, and logical volumes within a volume group.

Before discussing the present application, a cursory discussion of a volume group in a UNIX based system might be helpful. FIG. 4A illustrates the relationship among physical volumes, physical devices, and logical volumes within a volume group. A hierarchy of structures is used to manage fixed-disk storage. Each individual fixed-disk drive, called a physical volume (PV) has a name, such as /dev/hdisk0. PVs are depicted as first PV 402, second PV 404, and third PV 406. PVs 402, 404 and 406 belong to a volume group (VG)—volume group 400. All of the physical volumes in a volume group are divided into physical partitions (PPs). In the depicted example, PV 402 is divided into PPs 421, 424, 431, 434, 441, 444, 451 and 452; PV 404 is divided into PPs 422, 425, 432, 435, 442, 445, 461 and 462; and PV 406 is divided into PPs 423, 426, 433, 436, 443, 446, 471 and 472, which are all of the same size.

Within volume group 400, one or more logical volumes (LVs) are defined. First logical volume 412 and second logical volume 414 are depicted. Logical volumes are groups of information located on physical volumes. Data on logical volumes appears to be contiguous to the user but can be discontiguous on the physical volume.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention. The data processing system depicted in FIG. 2 may be, for example, an IBM RISC/System 6000 system, a product of International Business Machines Corporation in Armonk, N.Y., running the Advanced Interactive Executive (AIX) operating system.

Logical volumes may correspond to physical partitions located on more than a single physical volume. In the present example, each of LPs 420, 430 and 440 is allocated a pair of PPs on each of the three physical volumes. PPs 421, 424, 431, 434, 441 and 444 on PV 402 are allocated, two each, to LPs 420, 430 and 440, respectively. The PPs on PVs 404 and 406 are similarly allocated to LPs 420, 430 and 440.

Mirroring requires allocation of extra physical partitions. As a practical matter, a mirror is usually allocated on a separate physical volume from the original logical volume so that, if the disk containing the original logical partition becomes unavailable, the mirror remains available on another physical volume.

Figure 4B:
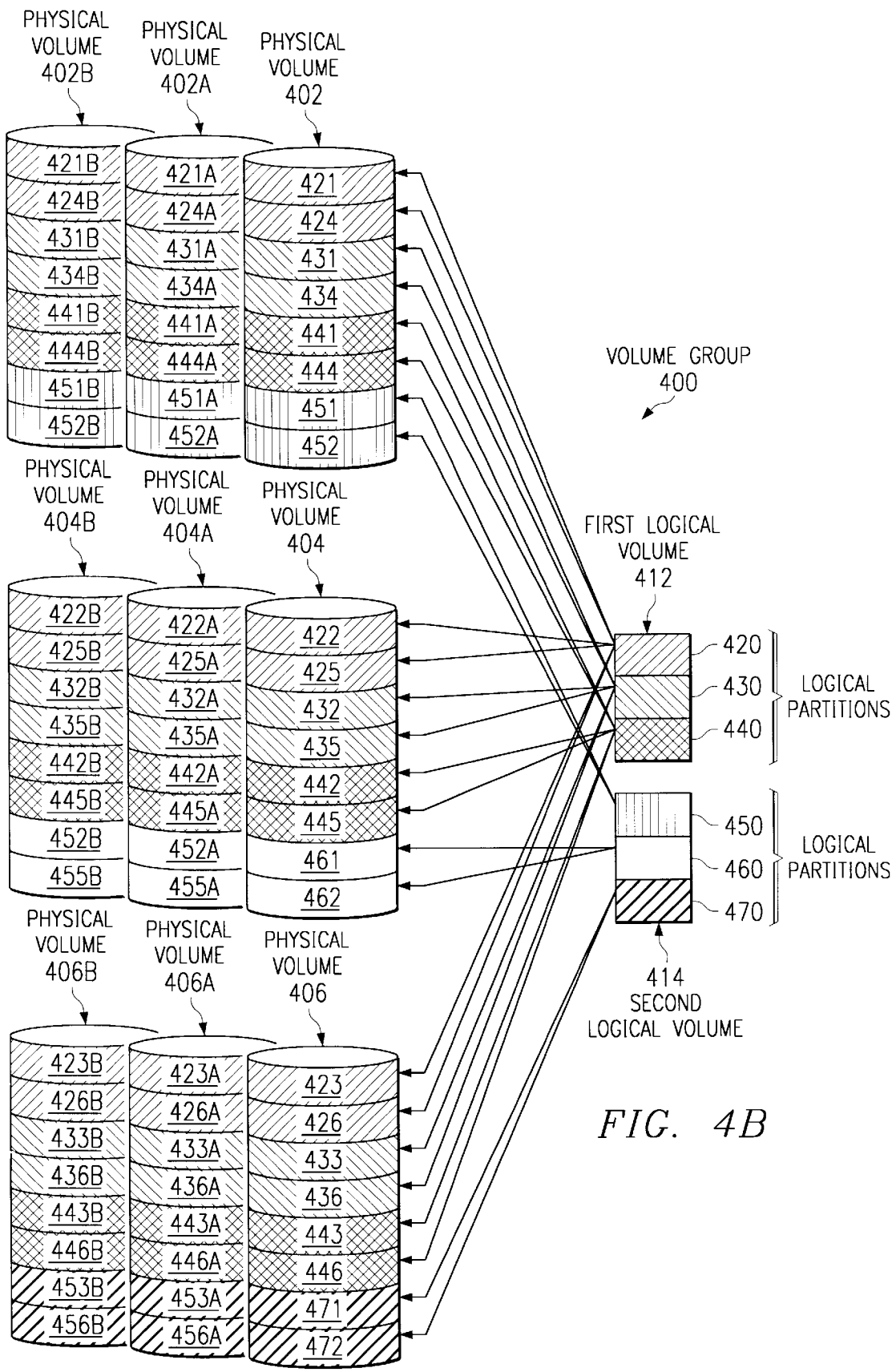
FIG. 4B depicts a volume group including mirrors.

FIG. 4B depicts volume group 400, including mirrors. The data stored on each of PVs 402, 404 and 406 are mirrored. Each of the physical partitions servicing a logical partition corresponds to a mirror physical partition in PVs 402A, 402B, 404A, 404B, 406A and 406B. A and B denote the physical volumes and physical partitions used in the first and second mirrors; i.e. the original logical partition stored on PP 421 is mirrored by copy one on PP 421A and copy two on PP 421B, and so on. It is a misnomer to say that the physical partitions are mirrored; actually, the logical volume corresponding to the physical volume is mirrored. However, the physical volume servicing the mirror will normally contain the exact number of physical partitions for storing the mirrored logical volume as are allocated in the original physical volume for the original logical volume. When the exact number of partitions are not contained in a mirror this is called sparse mirroring. Sparse mirroring can only be supported when striping sits on top of mirroring.

The mirror configuration depicted in FIG. 4B shows two complete mirrors for mirroring LVs 412 and 414, thus two copies of the logical volumes are being updated during each operation. However, the mirrors for each of the logical partitions allocated for LV 412 span three physical volumes or drives, while the logical partitions of LV 414 are each serviced by only a single disk. For instance, examine LP 420 of LV 412. LP 420 is serviced by six physical partitions, PPs 421 through 426, which are located, two each, on all of PVs 402, 404 and 406. (Note the corresponding fill pattern depicted in FIG. 4B.) In contrast, LP 450 is serviced by PPs 451 and 452, located on one disk, PV 402, such that the logical volume is serviced by a single disk. Each mirror servicing original LPs 450, 460 and 470 stores a copy of the original logical partition on a pair of physical partitions located on a single physical volume.

As discussed above with respect to LV 412, copy one of original LP 420 is serviced by PPs 421A through 426A, located on PVs 402A, 404A and 406A. Thus, PPs 421A to 426A are allocated for servicing physical mirror one. Copy two of original LP 420 is serviced by PPs 421B to 426B located on all of PVs 402B, 404B and 406B. Thus, PPs 421B to 426B are allocated for serving mirror two.

Importantly, when more than one physical partition is allocated for a logical volume, and the partitions reside on different physical volumes, the full I/O capacity of each disk can be used simultaneously. Thus, the allocation of physical partitions for LV 412 in the depicted example allows for more efficient Read/Write operations than the allocation of physical partitions for LV 414. The allocation of physical partitions for LV 412 allows the blocks of data associated with LV 412 to be striped on the physical partitions, whereas striping is impossible for LV 414 because all of the physical partitions have been allocated on a single disk.

Striping is the segmentation of logically sequential data, such as a single file, so that data segments (stripe units) can be read or written to multiple physical devices (usually disk drives or physical volumes) in a round-robin fashion. This technique is useful if the processor is capable of reading or writing data faster than a single disk can supply or accept it. While data is being transferred from the first disk, the second disk is locating the next segment. Striping allows a logical volume to be spread across several disk drives in such a way that the I/O through put of the disk drives (physical volumes) can be used in parallel to access data on the logical volume.

FIG. 5A depicts PVs 402, 404 and 406, which were shown in FIGS. 4A and 4B as striped volumes. For simplicity, the diagram of the physical volumes is limited to only sample physical partitions. Only the original data from LP 420 of LV 412 (not shown) will be used in discussing the striping operation.

FIG. 5A depicts three disks, PVs 420, 404 and 406. Data is accessed on each physical partition in a stripe unit (SU). Each physical partition contains (physical partition size/ stripe unit size) stripe units. The number of physical partitions allocated to the logical volume must be an integral multiple of the number of disk drives used. In the example, eighteen physical partitions are allocated for three drives. Logically sequential data, such as a file, are segmented into stripe unit-sized data segments and stored in a stripe unit on each physical partition serviced by the stripe.

By way of example, in an ordinary logical volume, such as LV 412 shown in FIG. 4A, the data addresses correspond to the sequence of blocks in the underlying physical partitions. The logical volume manager (LVM) determines which physical blocks on which physical drives correspond to a block being read or written. If more than one drive is involved, as in the present example, the necessary I/O operations are scheduled for all drives simultaneously.

In a striped logical volume, such as shown in FIG. 5A, the logical volume manager addresses follow the sequence of stripe units, SU 0, SU 1, SU 2 and so on. A complete stripe consists of one stripe unit on each of the physical devices that contains part of the striped logical volume. In the depicted example, the first stripe of LV 412 consists of SU 0, SU 1 and SU 2; the second stripe consists of SU 3, SU 4 and SU 5; and the Mth stripe consists of SU N-2, SU N-1 and SU N.

For optimizing the Read operation, it is assumed that data is sequentially stored on SUs 0 to N on PPs 421, 422 and 423, for example, before being sequentially stored on SUs 0 to N on PPs 424, 425 and 426, thereby focusing the I/O capacity of each disk drive on one physical partition at a time.

As an example, suppose that LV 412 has a stripe unit size of 4KB, consisting of eighteen 1 MB partitions, PPs 421, 424, 431, 434, 441 and 444 allocated from PV 402, PPs 422, 425, 432, 435, 442 and 445 allocated from PV 404, and PPs 423, 426, 433, 436, 443 and 446 allocated from PV 406. If an application is reading a large sequential file, each Read will result in two or three I/Os being scheduled to each of the physical volumes (disk drives), assuming that the file is on consecutive blocks in the logical volume. The Read operations are performed in the order determined by a disk device driver associated with disk adapter 520. The requested data is assembled from the various pieces of input and returned to the application. Although each disk device has a different initial latency depending on where its accessor is at the beginning of the operation, once the process reaches a steady state, all three disks should read at close to their maximum speed.

Figure 5B:
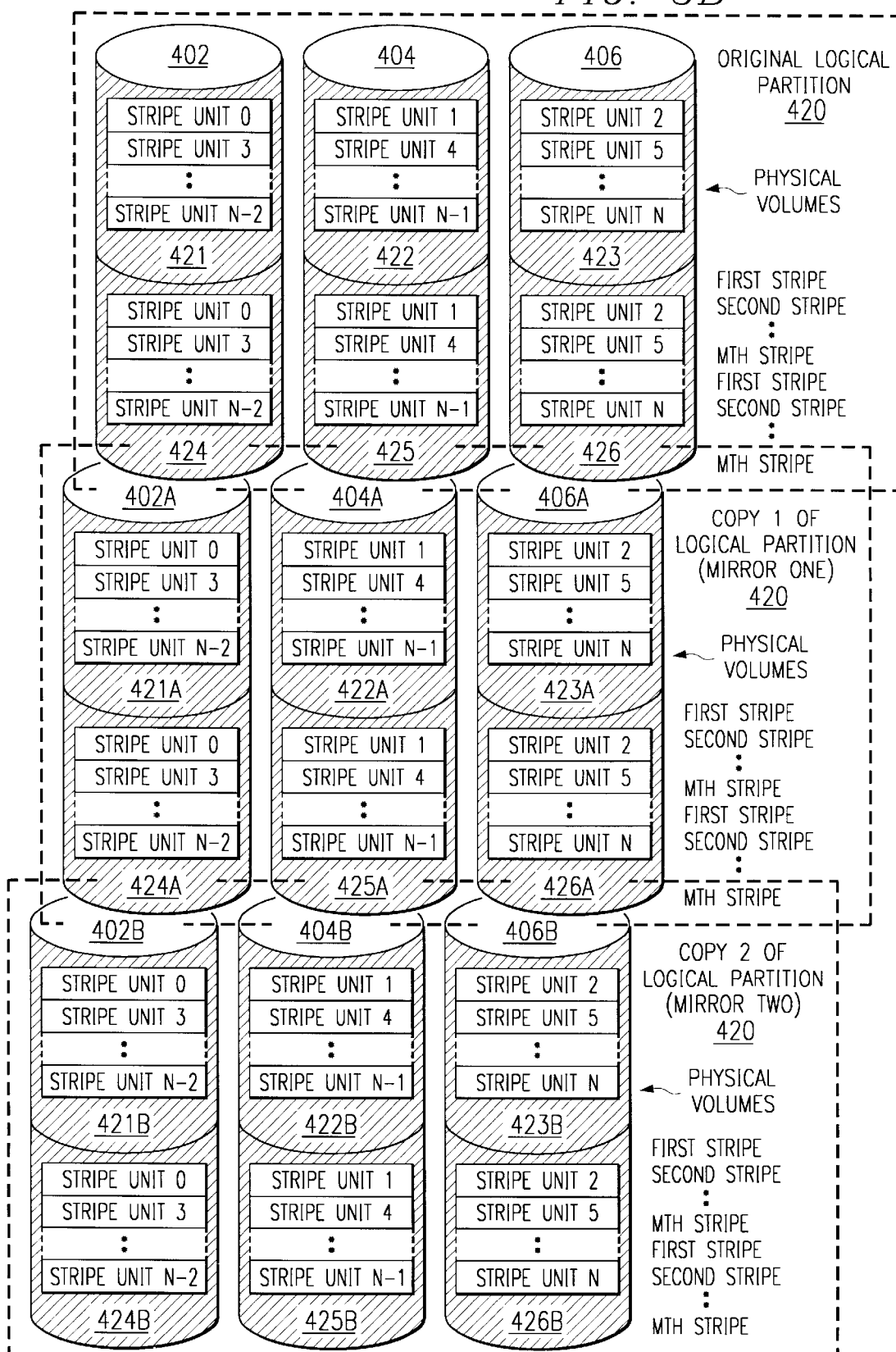
FIG. 5B is a diagram depicting the allocation of physical partitions for servicing a striped logical volume.

As is evident from FIG. 5B, a striped mirror can be spread across several disks. FIG. 5B is a diagram depicting the allocation of physical partitions for servicing a striped logical volume, more specifically, LP 420. As discussed immediately above, PPs 421 through 426 are allocated for storing LP 420. PPs 421 and 424 are allocated from PV 402, PPs 422 and 425 are allocated from PV 404, and PPs 423 and 426 are allocated from PV 406. The physical partitions are allocated similarly for each of the copies (although they need not be). PPs 421A through 426A are allocated for storing copy one of original LP 420. PPs 421A and 424A are allocated from PV 402A, PPs 422A and 425A are allocated from PV 404A, and PPs 423A and 426A are allocated from PV 406A. Finally, PPs 421B through 426B are allocated for storing copy two of original LP 420. PPs 421B and 424B are allocated from PV 402B, PPs 422B and 425B are allocated from PV 404B, and PPs 423B and 426B are allocated from PV 406B.

The nomenclatures and partition allocations are kept simple for this example; however, one of ordinary skill in the art would realize that partition allocations for a volume group may vary from the example in both nomenclature and complexity.

The physical partitions allocated for original LV 412 are striped as discussed with respect to FIG. 5A. FIG. 5B depict two mirrors for storing first and second copies of original LV 412. Turning to mirror one, note that it mirrors the stripes in the original logical partitions. The first stripe of copy one of LV 412 consists of SU 0, SU 1 and SU 2; the second stripe consists of SU 3, SU 4 and SU 5; and the Mth stripe consists of SU N-2, SU N-1 and SU N. The stripes allocated for mirror two on PVs 402B, 404B and 406B are identical to those described above, thereby simultaneously scheduling the necessary I/O operations for all disk drives.

Figure 6:
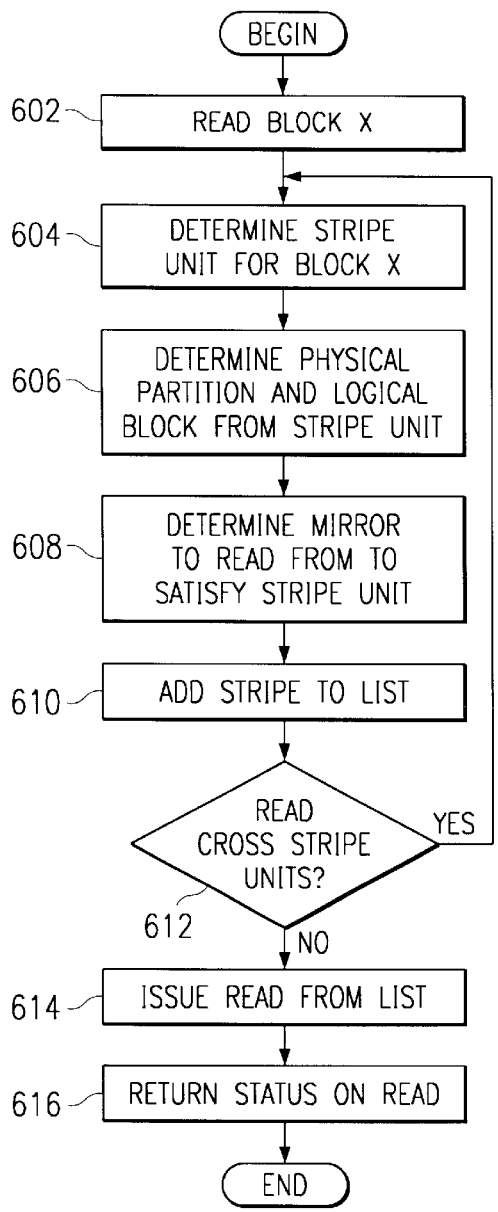
FIG. 6 depicts a Read operation involving the striping processes in accordance with the prior art.

The process of striping a volume, such as shown in FIGS. 5A and 5B, can best be understood by describing the underlying striping process. FIG. 6 depicts a Read operation involving the striping process in accordance with prior art. As discussed above, the striping operation is controlled by the logical volume manager. The LVM is the set of operating system commands, library subroutines, and other tools that allow one to establish and control logical volume storage. The LVM manages disk space at a logical level. It controls fixed-disk resources by mapping data between logical and physical storage, and by allowing data to span multiple disks and to be discontiguous, replicated, and dynamically expanded.

An LVM reads management data from the physical volumes defined in the volume group. This management data, which includes a volume group descriptor area (VGDA) and a volume group status area (VGSA), is stored on each physical volume of the volume group. The VGDA contains information that describes the mapping of physical partitions to logical partitions for each logical volume in the volume group, as well as other vital information, including, for example, a time stamp. The VGSA contains information such as, which physical partitions are stale and which physical volumes are missing (that is, not available or active) when a vary-on operation is attempted on a volume group.

Each of logical volumes 412 and 414 consists of one or more logical partitions (LPs). LV 412 consists of LPs 420, 430 and 440, while LV 414 consists of LPs 450, 460 and 470. Each logical partition corresponds to at least one physical partition (PP). When adding a physical volume to a volume group, the physical volume is partitioned into contiguous, equal-sized physical partitions. A physical partition is the smallest unit of storage space allocation. Logical partitions may correspond to a single physical partition. In the case of LV 414, each of LPs 450, 460 and 470 corresponds to a pair of PPs, each pair located on a separate physical volume. PPs 451 and 452 correspond to LP 450; PPs 461 and 462 correspond to LP 460; and PPs 471 and 472 correspond to LP 470. Although the logical partitions are numbered consecutively, the underlying physical partitions are not necessarily consecutive or contiguous.

The LVM controls disk resources by mapping data between a more simple and flexible logical view of storage space and the actual physical disks. The LVM does this using a layer of device driver code in the logical volume device driver (LVDD) that runs above traditional disk device drivers. The LVDD is a pseudo-device driver that manages and processes all I/O.

Returning to FIG. 6, the Read operation block begins with the LVM receiving a Read request to read logical block X (step 602). The Read request hits a UNIX driver with a block offset and a size. The size of the partitions are known in advance. Because the logical volume is striped, the data addresses follow the sequence of stripe units rather than corresponding to the sequence of blocks in the underlying physical partitions. The data address of the stripe unit for block X must be determined from the offset and size. Therefore, the LVM determines the stripe units for block X (step 604). For example, given a partition size of 1 MB and a stripe unit size of 4K, a 12K Read of offset 0 results in the physical reading of stripe unit 0 at offset 0, stripe unit 1 at offset 1 MB, and stripe unit 2 at offset 2 MB within the logical volume. A 12K Read of offset 12288 (12K) results in the reading for stripe unit 3 at offset 4k, stripe unit 4 at offset of 1 MB+4k, and stripe unit 5 at offset 2 MB+4k of the logical volume. The LVM then determines the physical partition and logical block based on the stripe unit (step 606).

Normally, whenever data on a logical partition is updated, all the physical partitions containing that logical partition are automatically updated, as are the physical partitions on the mirrors. However, physical partitions can become stale because the physical volume was unavailable at the time of an update. In this case, the mirror serviced by the partition is no longer used, and the mirror also is considered unavailable.

Additionally, the LVM can improve Read performance by reading the copy on the least busy disk. Unless disks are attached to different adapters, Writes always cost the same because all copies must be updated; however, only one copy needs to be read. Therefore, the LVM must determine which mirror to read from to satisfy each stripe unit (step 608). FIG. 8 describes the process of determining an available mirror in detail. The stripe containing the unit is added to the list (step 610).

A check is then made to determine if the Read (block X) crosses the stripe units (step 612). If the Read crosses the stripe units, the process returns to step 604, where the next stripe unit for the Read of block X is determined, and that stripe is eventually added to the list. Once it has been determined that the list fully encompasses the Read, the physical reads on the stripe units are issued (step 614). Finally, the status of the Read is returned when all of the stripe unit reads return (step 616).

A problem occurs in prior art when one disk in a mirror goes down. As mentioned above, when data in any partition of mirrors becomes stale, the entire mirror is not used, causing other physical partitions to become stale. Therefore, when the downed disk is replaced, the entire mirror must be re-synchronized with the logical volume. The synchronization process can be time consuming, depending on hardware characteristics and the amount of data involved. For the re-sync to be successful, at least one good copy of the logical volume should be accessible, and the physical volumes that contain this copy should be in ACTIVE state.

The LVM refreshes stale partitions to a consistent state by copying the current data from an up-to-date physical partition to the stale partition. This process is called mirror synchronization. This synchronization is a problem for striped logical volumes since the logical Reads are broken up into the stripe units that make up the data on the different physical partitions. Therefore, if a disk is replaced, the entire mirror must be re-synchronized by issuing individual stripe unit Reads for the entire mirror.

In accordance with a preferred embodiment of the present invention, synchronizing stale partitions is based on logical partitions and not based on stripe units. In essence, the mirrors are striped rather than the stripes mirrored. Therefore, a single disk in a striped mirror can be replaced without re-synchronizing the entire mirror, so only the partitions on the replacement disk are copied. The present invention allows a re-sync Read to read on physical partition boundary rather than via the stripe units. This implementation uses less resource on the re-sync as the re-sync IO request is not split into N-number of stripe units. IO requests are serialized across both the stripe unit and the real partitions, thereby eliminating the possibility of different IOs conflicting while responding to IO requests.

In so doing, only unavailable disks in a mirror are not used and then re-synced. For instance, returning to FIG. 5B, assume that each stripe unit has a size of 4K, and each physical partition has a size of 1 MB. An application issues a Read of 8K at offset zero of LV 412. This would mean that the first 4K is serviced by the stripe unit 0 in PP 421 and the second 4K is serviced by the stripe unit 1 in PP 422. So within the logical volume, the Read is broken up into stripe unit Read on the first stripe unit is at offset 0 and a stripe unit Read on the second stripe unit at offsize 1 MB. Remember that LP 420 is serviced by PPs 421–426. So within LV 412, the first stripe unit, SU 0, is at offset 0, and the second stripe unit, SU 1, is at offsize 1 MB. Now, if this is a re-sync Read involving a stale partition, then rather than splitting the Read into stripe units, the block would be read from the logical volume boundary using the offsets, as if no striping existed. By so doing, when one disk in the mirror is not used, the remaining disks in the mirror may continue to be used, contrary to the prior art where the entire mirror is not used. Therefore, a re-sync Read of 8K at 0 offset is read from the physical partition boundary at 0 offset in a single read rather than breaking up the Read into stripe units. The 8K Read would then be serviced by 8K of PP 421.

Figure 7A:
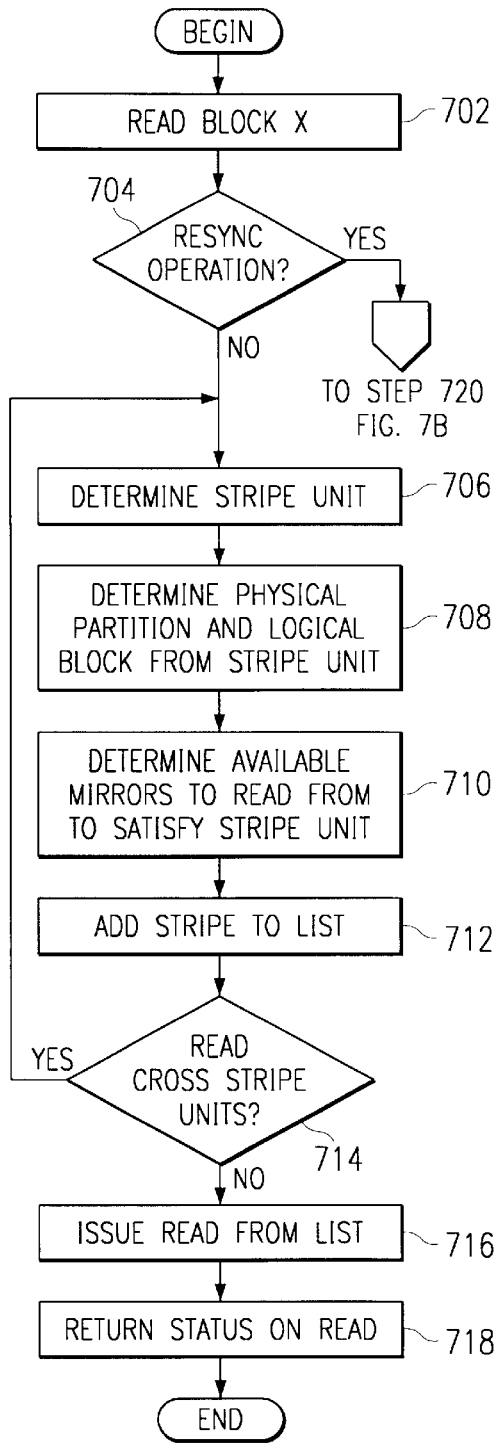
FIGS. 7A and 7B depict a flowchart of a Read operation involving re-synchronizing a striped mirror in accordance with a preferred embodiment of the present invention.
Figures 7B, 8:
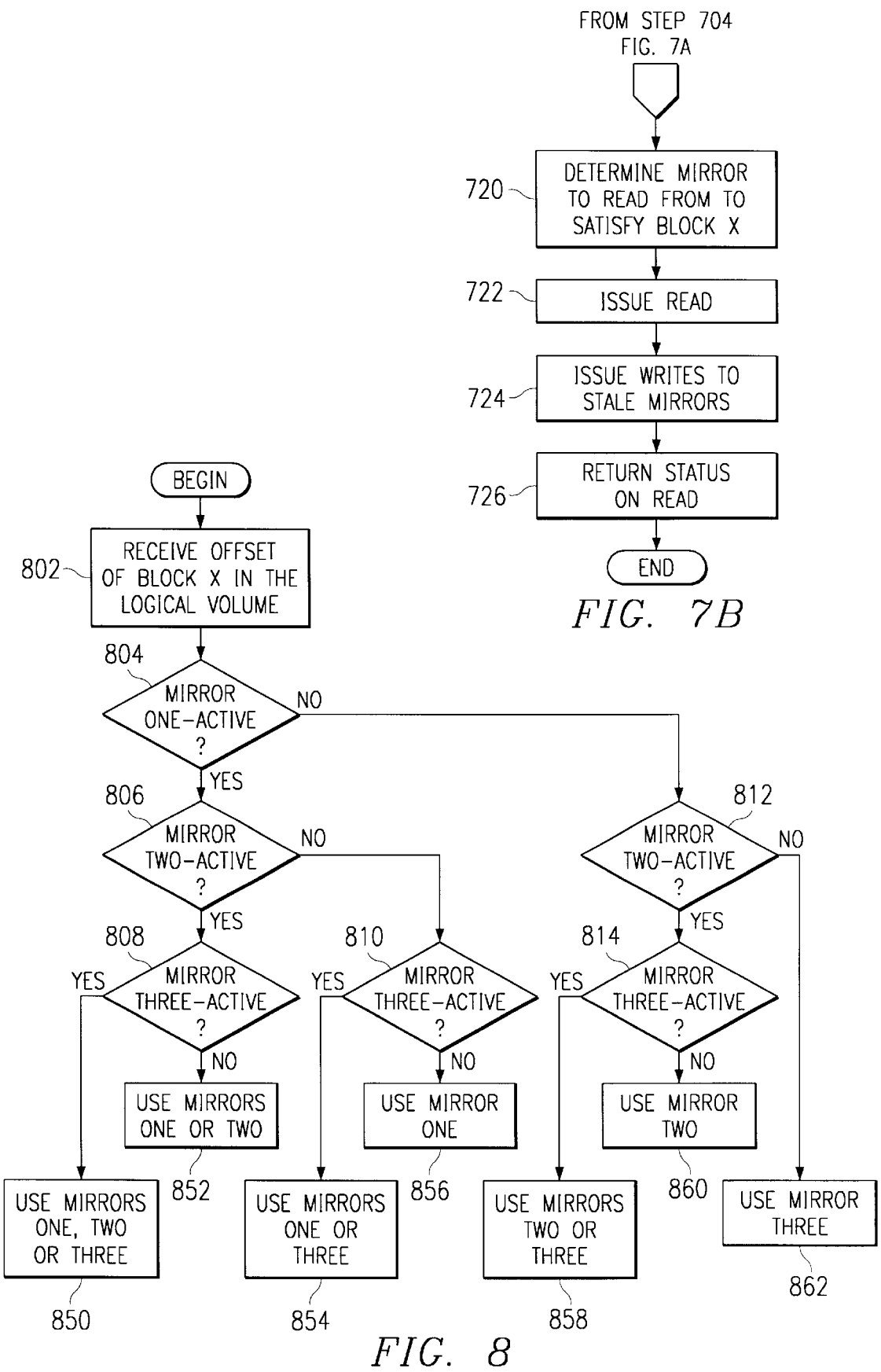
FIG. 8 depicts a preferred subroutine for determining the available mirrors to read from for a mirrored Read.

FIGS. 7A and 7B depict flowcharts of a Read operation involving re-synchronizing striped mirrors in accordance with a preferred embodiment of the present invention. The process begins with the LVM receiving a Read request to read logical block X, identical to that described with respect to step 602 in FIG. 6 (step 702). Next, a determination is made as to whether the Read is a re-sync operation (step 704). If the Read is not a re-sync operation, the process follows the prior art Read operation for striped mirrors, as discussed above. The LVM determines the stripe units for block X (step 706). The LVM then determines the physical partition and logical block based on the stripe units (step 708). Then the LVM can determine which mirror to read from to satisfy the stripe unit (step 710). The mirror must be available in order to read from it. (FIG. 8 describes the process of determining an available mirror in detail.) The stripe containing the stripe unit is added to the list (step 712). A check is then made to determine if the Read (block X) crosses the stripe units (step 714). If it crosses, the process returns to step 706, where the next stripe unit for block X is determined, and that stripe is eventually added to the list.

Once it has been determined that the stripe list fully encompasses the volume of the logical Read, the Read is issued from the stripes on the list to the LVDD (step 716). Finally, the status of the Read is returned (step 718).

Returning to step 704, however, if the Read is a re-sync operation, the process flows to step 720, shown in FIG. 7B, where the LVM determines which mirror to read from for satisfying logical block X. Again, the mirror must be available in order to read from it. (FIG. 8 describes the process of determining an available mirror in detail.) A re-sync Read is not issued on individual stripe units by breaking up the Read into individual stripe unit reads. A re-sync Read issues only one physical Read on the partition. In a preferred embodiment of the present invention, the stripe units are not used for the re-sync Read because the offset and size of block X are known, allowing the re-sync Read to read against the physical partition boundary. From the offset, a boundary of the partition to be read from can be determined. The size of block X is used to determine how much data should be read from the partition, at a starting point corresponding to the logical offset. Both the stripe unit and the real partition boundary are serialized across, in order to eliminate the possibility of IO conflict.

A Read can then be immediately issued for block X by merely knowing which mirror is available to read (step 722). For instance, referring again to FIG. 5B, in a re-sync Read of 16K at offset of 0K, 16K data is read from can available partition corresponding to a 0K logical volume offset. The Read then would read data that is in stripe units 0, 3, 6 and 9, assuming 4K stripe unit size, of an available disk.

Writes are issued in an identical manner to the stale mirrors (step 724). That is, data read from the available mirror is written, in a like manner, to the stale partition, once those partitions are active. Therefore, the 16K of data that was in stripe units 0, 3, 6 and 9 from the available mirror, is written in stripe units 0, 3, 6 and 9 on the stale partition which is now active for writing.

Importantly, stripe units have no function in the re-sync operation of the present invention and are used in the above example only to show the relative position of the data within a particular partition. In a re-sync Read or Write, the operation is issued as a single Read or Write from the boundary of the physical partition and not broken up in to individual stripe units across several partitions. Because the present invention allows partitions in a mirror other than stale partitions to be continuously updated, only the stale data need be written when the disk containing the stale partitions is active. Pragmatically, although it is technically possible to read from non-stale partitions of a mirror with a stale partition, it is much less complicated just to take the data from an active mirror. However, active partitions of a mirror with a stale partition can be continuously updated, thereby requiring only the stale partition to be re-synced. The status of the Read is then returned to the LVM (step 726), and the process ends.

In contrast to the example discussed at step 604 of FIG. 6, where a 12K Read of block 0 resulted in the physical reading of stripe units 0, 1 and 2, a 12K re-sync Read of block 0 results in one physical Read issued that reads what is in stripe units 0, 3 and 6. This implementation uses less resources on the re-sync than the prior art because only one Read is issued to a physical partition rather than splitting the re-sync IO request into N stripe units, as is taught by the prior art. In order to do this, the offset of the logical block is determined in advance by serializing the IO request across both the stripe units and the real partition boundary, thereby eliminating the possibility of different IOs conflicting while responding to IO requests.

It is also important to note that a single re-sync Read may not be adequate for updating the entire logical partition serviced by the physical partition. Therefore, more than a single re-sync Read may be issued in order to update the entire volume of data in the physical partition prior to making the mirror available.

Finally, FIG. 8 depicts a preferred subroutine for determining the available mirrors to read from for a mirrored Read. This subroutine may be employed in each of steps 608 in FIG. 6, 710 in FIG. 7A, and 720 in FIG. 7B. Initially, the LVM receives the offset of block X in the logical volume (step 802). For each mirror, FIG. 5B depicts two mirrors; but for this example, the mirror Read looks to three mirrors.

The process is a progressive iteration for checking the state of each mirror. In the present example, the first mirror is checked (step 804). If mirror one is not active, the process flows to step 812, where mirror two is checked. If neither mirror one nor mirror two is active, the LVM is forced to use mirror three (step 862). If, at step 812, it is determined that mirror two is active, mirror three is then checked (step 814). If both mirrors two and three are active, then either mirror two or three can be used (step 858). If active, mirror two must be used, as both mirrors one and two are not active (step 860).

Returning to step 804, if mirror one is active, it may be immediately chosen for the mirrored Read; however, the first choice might be the busiest drive. Therefore, if another, less busy drive is active, that drive might be a better choice for a mirrored Read. Assuming mirror one is active, the process flows to step 806 and checks mirror two. If mirror two is not active, mirror three is checked (step 810). If both mirrors one and two are active, then either mirror one or two can be used (step 854). If not, mirror one must be used (step 856).

Returning to step 806, if mirrors one and two are active, the process flows to step 808, and mirror three is checked. If all of mirrors one, two and three are active, then any of mirrors one, two or three can be used (step 850). If mirror three is not active, either mirror one or two must be used (step 852).

It is important to note that, while the present invention has been described in the context of a fully functioning data processing system, those of ordinary skill in the art will appreciate that the processes of the present invention are capable of being distributed in the form of a computer readable medium of instructions and a variety of forms, and that the present invention applies equally regardless of the particular type of signal bearing media actually used to carry out the distribution. Examples of computer readable media include recordable-type media, such as floppy discs, hard disk drives, RAM, and CD-ROMs and transmission-type media, such as digital and analog communications links.

The description of the present invention has been presented for purposes of illustration and description but is not intended to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated.

What is claimed is:

1. A data processing system implemented method for resynchronizing a striped mirror, comprising:

receiving information that a disk is stale, wherein the disk is associated with a mirror; and performing a resynchronizing Read for a block on only the stale disk, wherein prior to performing a resynchronizing Read, the method comprises:

serializing an IO request across both a stripe unit and a partition boundary.

2. The method recited in claim 1, wherein performing a resynchronizing Read further comprises:

determining an active mirror for the block;

reading the block from an active partition on the active mirror; and writing the block to the stale partition on the stale disk.

3. The method recited in claim 2, wherein reading the block further comprises:

reading the block from the active partition as a single Read.

4. The method recited in claim 2, wherein reading the block further comprises:

reading the block on a real partition boundary on the active partition.

5. The method recited in claim 2, wherein reading the block further comprises:

reading the entire block from the active partition.

6. The method recited in claim 2, wherein reading the block further comprises:

reading the entire block as a single re-sync request.

7. The method recited in claim 2, wherein writing the block further comprises:
    writing the block to the stale partition as a single Write.
8. The method recited in claim 2, wherein writing the block further comprises:
    writing the block to a real partition boundary on the stale partition.
9. The method recited in claim 2, wherein reading the block further comprises:
    writing the entire block as a single re-sync request.
10. A data processing system implemented method for resynchronizing a striped mirror, comprising:
    serializing IO requests to both a logical region boundary and stripe units
    issuing a re-sync Read IO request for a block;
    determining an available mirror for the block;
    issuing a single Read for reading the block from a boundary on a first disk, wherein the first disk is associated with the available mirror; and
    issuing a single Write for writing the block from a boundary on a second disk, wherein the second disk is stale.
11. A data processing system implemented method for resynchronizing a striped mirror, comprising:
    issuing a Read IO request for a first block;
    determining at least two stripe units associated with the first block;
    identifying a physical region for each stripe unit;
    issuing separate Read IO requests for each stripe unit associated with the block for each physical region;
    issuing a re-sync Read IO request for a second block;
    determining an available mirror for the second block;
    issuing a single Read IO request for reading the second block from a boundary on a second physical region, wherein the second physical region is associated with the available mirror; and
    issuing a single Write IO request for writing the second block from a boundary on a third region, wherein the third region is stale.
12. A data processing system for resynchronizing a striped mirror, comprising:
    receiving means for receiving information that a disk is stale, wherein the disk is associated with a mirror;
    performing means for perform a resynchronizing Read for a block on only the stale disk; and
    serializing means for serializing an IO request across both a stripe unit and a partition boundary.
13. The system recited in claim 12, wherein the performing means for performing a resynchronizing Read further comprises:
    determining means for determining an active mirror for the block;
    reading means for reading the block from an active partition on the active mirror; and
    writing means for writing the block to the stale partition on the stale disk.
14. The system recited in claim 13, wherein the reading means for reading the block further comprises:
    reading means for reading the block from the active partition as a single Read.
15. The system recited in claim 14, wherein the reading means for reading the block further comprises:
    reading means for reading the block on a real partition boundary on the active partition.
16. The system recited in claim 13, wherein the reading means for reading the block further comprises:
    reading means for reading the entire block from the active partition.
17. The system recited in claim 13, wherein the reading means for reading the block further comprises:
    reading means for reading the entire block as a single re-sync request.
18. The system recited in claim 13, wherein the writing means for writing the block further comprises:
    writing means for writing the block to the stale partition as a single Write.
19. The system recited in claim 13, wherein the writing means for writing the block further comprises:
    writing means for writing the block to a real partition boundary on the stale partition.
20. The system recited in claim 13, wherein the reading means for reading the block further comprises:
    writing means for writing the entire block as a single re-sync request.
21. A data processing system for resynchronizing a striped mirror, comprising:
    serializing means for serializing IO requests to both stripe units and a logical region boundary;
    issuing means for issuing a re-sync Read IO request for a block;
    determining means for determining an available mirror for the block;
    issuing means for issuing a single Read for reading the block from a boundary on a first disk, wherein the first disk is associated with the available mirror; and
    issuing means for issuing a single Write for writing the block from a boundary on a second disk, wherein the second disk is stale.
22. A data processing system for resynchronizing a striped mirror, comprising:
    issuing means for issuing a Read request IO request for a first block;
    determining means for determining at least two stripe units associated with the first block;
    identifying means for identifying a physical region for each stripe unit;
    issuing means for issuing separate Reads for each stripe unit associated with the block for each physical region;
    issuing means for issuing a re-sync Read IO request for a second block;
    determining an available mirror for the second block;
    issuing means for issuing a single Read for reading the second block from a boundary on a second physical region, wherein the second physical region is associated with the available mirror; and
    issuing means for issuing a single Write for writing the second block from a boundary on a third region, wherein the third region is stale.
23. A computer program product for implementing a method for resynchronizing a striped mirror, comprising:
    receiving instructions for receiving information that a disk is stale, wherein the disk is associated with a mirror;
    performing instructions for performing a resynchronizing Read for a block on only the stale disk; and
    serializing instructions for serializing an IO request across both a stripe unit and a partition boundary.

* * * * *